United States Patent
Isaka et al.

(10) Patent No.: US 6,658,020 B1
(45) Date of Patent: *Dec. 2, 2003

(54) VOICE DATA EXCHANGE SYSTEM

(75) Inventors: Masazumi Isaka, Tokyo (JP); Keiji Matsunuma, Tokyo (JP); Yoshinori Sekine, Tokyo (JP)

(73) Assignee: Oki Electric Industry Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/260,513

(22) Filed: Mar. 2, 1999

(30) Foreign Application Priority Data

Mar. 5, 1998 (JP) .......................... 10-053135

(51) Int. Cl.[7] ................................. H04J 3/16
(52) U.S. Cl. ...................... 370/466; 370/352; 370/392; 370/395.1
(58) Field of Search ............... 370/352, 355, 370/356, 357, 359, 360, 389, 392, 419, 420, 422, 425, 426, 466, 467, 474; 375/220; 379/93.01, 93.05, 93.14, 93.15, 93.18, 93.26, 224, 229

(56) References Cited

U.S. PATENT DOCUMENTS

| | | | | |
|---|---|---|---|---|
| 4,958,341 A | * | 9/1990 | Hemmady et al. | 370/352 |
| 4,970,723 A | | 11/1990 | Lin | |
| 5,233,607 A | * | 8/1993 | Barwig et al. | 370/397 |
| 5,742,596 A | * | 4/1998 | Baratz et al. | 370/356 |
| 5,864,553 A | * | 1/1999 | Aramaki | 370/392 |
| 5,982,767 A | * | 11/1999 | McIntosh | 370/352 |
| 6,026,086 A | * | 2/2000 | Lancelot et al. | 370/353 |
| 6,130,891 A | * | 10/2000 | Lam et al. | 370/252 |
| 6,134,235 A | * | 10/2000 | Goldman et al. | 370/352 |
| 6,141,341 A | * | 10/2000 | Jones et al. | 370/352 |
| 6,169,734 B1 | * | 1/2001 | Wilson | 370/352 |
| 6,201,804 B1 | * | 3/2001 | Kikinis | 370/352 |
| 6,233,234 B1 | * | 5/2001 | Curry et al. | 370/356 |
| 6,246,679 B1 | * | 6/2001 | Yamamoto | 370/352 |
| 6,259,691 B1 | * | 7/2001 | Naudus | 370/352 |
| 6,272,126 B1 | * | 8/2001 | Strauss et al. | 370/352 |
| 6,298,120 B1 | * | 10/2001 | Civanlar et al. | 379/219 |
| 6,339,594 B1 | * | 1/2002 | Civanlar et al. | 370/352 |

FOREIGN PATENT DOCUMENTS

| | | |
|---|---|---|
| JP | 5-167733 | 7/1993 |
| JP | 06338887 | 12/1994 |
| JP | 09247214 | 9/1997 |

* cited by examiner

*Primary Examiner*—Hassan Kizou
*Assistant Examiner*—David Odland
(74) *Attorney, Agent, or Firm*—Venable; James R. Burdett

(57) ABSTRACT

A trunk carries out mutual exchange of voice data and MAC frames used in a public telephone circuit. A SLIC carries out mutual exchange of voice data and MAC frames used by PBX telephone devices. Internet protocol telephone devices conduct communications using MAC frames. A LAN switch houses a trunk, SLIC, and Internet protocol telephone devices, and switches ports in accordance with the destination address contained in a MAC frame. A main CPU executes communications protocols for call origination processing, call reception processing and disconnection processing, by communicating with the trunk, SLIC and Internet protocol telephone device.

23 Claims, 5 Drawing Sheets

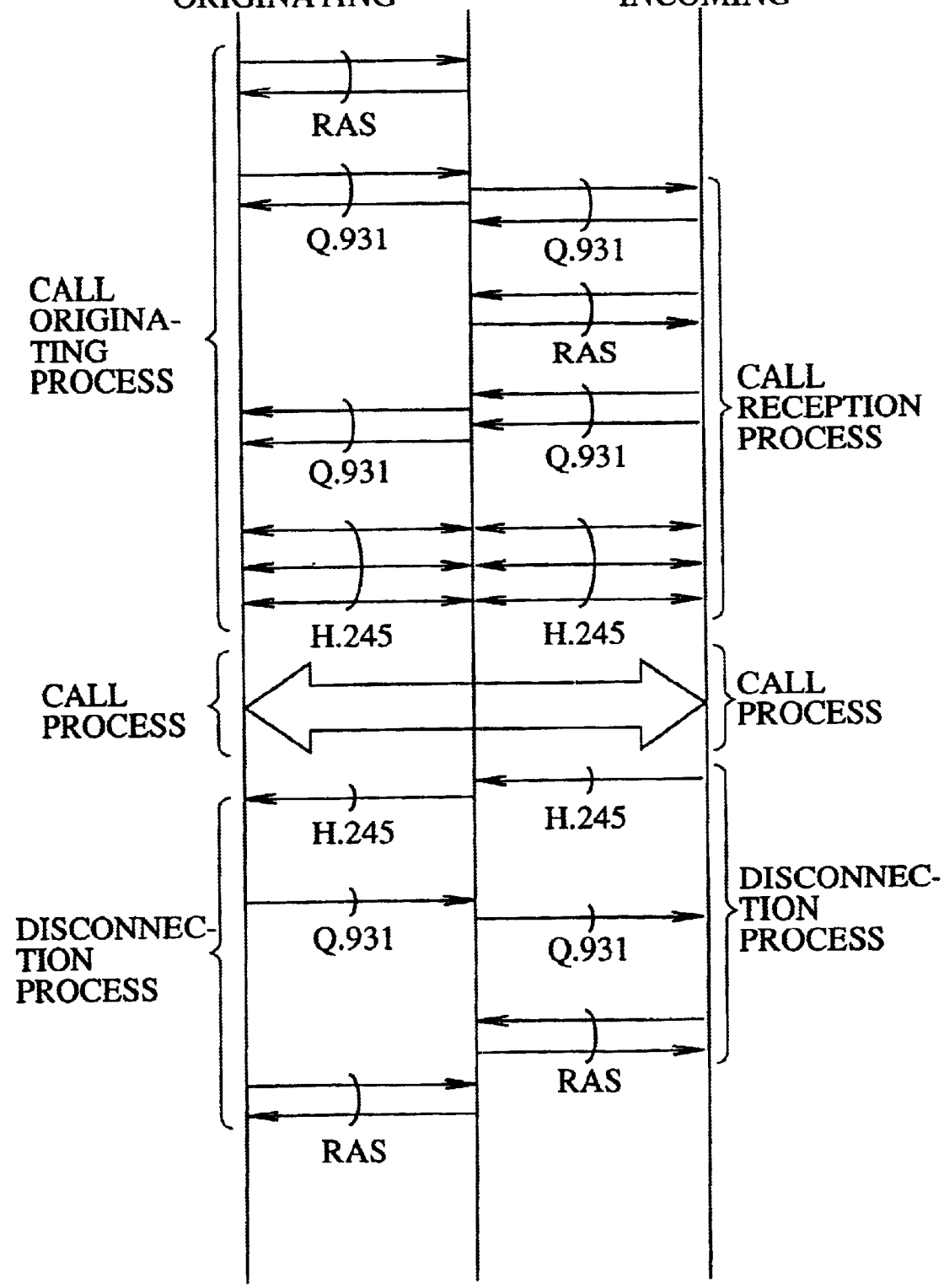

VOICE DATA EXCHANGE SYSTEM

BACKGROUND OF THE INVENTION

1. Field of the Invention

This invention relates to an exchange system for universal handling of data in a PBX (Private Branch Exchange), a LAN (Local Area Network), public communications networks, or the like, and more particularly, to an exchange system comprising a function for carrying out voice data communications between networks of different types.

2. Description of Related Art

Networks used for carrying out communications within a local area include networks using a digital PBX and networks using a LAN, and the like.

Communications networks using digital PBX are provided with a plurality of time division switches. A telephone terminal or low-speed data terminal having a communications rate of 64 kbps or less is connected to time division switches, by means of a balanced cable, or the like. Voice data is converted into data in packet format and is exchanged between the time division switches. In other words, this type of network uses a circuit switching system.

In a LAN, data terminals having a communications rate of 1–100 Mbps are connected directly by means of stranded cables, optical cables, or the like. Each data terminal exchanges frame data in MAC (Media Access Control) format. In a LAN, since each terminal communicates directly using a MAC address and terminal number, it is not necessary to provide an exchange. In other words, a LAN is a connectionless switching system. A LAN is able to conduct communication of voice data by using an Internet telephone. In this form of communication, a personal computer acting as a LAN terminal executes software in accordance with communications protocols. These communications protocols are based, for example, on ITU-T Recommendations H.323.

With the spread of LAN systems, situations arise where both networks using digital PBX and Internet telephone networks exist conjointly within the same area. However, since these networks use different types of communications paths and exchange systems, as described above, conventionally, it has not been possible to integrate these networks.

SUMMARY OF THE INVENTION

It is an object of this invention to provide an exchange system for conducting voice data communications between networks having different types of communications paths and exchange systems.

In order to achieve this, the voice data exchange system according to this invention comprises: first connecting means for carrying out mutual exchange of voice data used in a relay circuit of a telephone network and MAC frames; second connecting means for carrying out mutual exchange of voice data used by voice network telephone and MAC frames; data network telephone using MAC frames; switching means provided with a port for accommodating the first connecting means, a port for accommodating the second connecting means and a port for accommodating data network telephone, for carrying out switching of the ports in accordance with a destination address contained in a MAC frame; and main control means for executing communications protocols for call origination processing, call reception processing and disconnection processing, by communicating with the first connecting means, the second connecting means and the data network telephone.

BRIEF DESCRIPTION OF THE DRAWINGS

Further objects and advantages of this invention will become evident with reference to the accompanying drawings.

FIG. 6 is a conceptual diagram for describing the operation of the system illustrated in FIG. 1.

DESCRIPTION OF THE PREFERRED EMBODIMENTS

Figure 1:
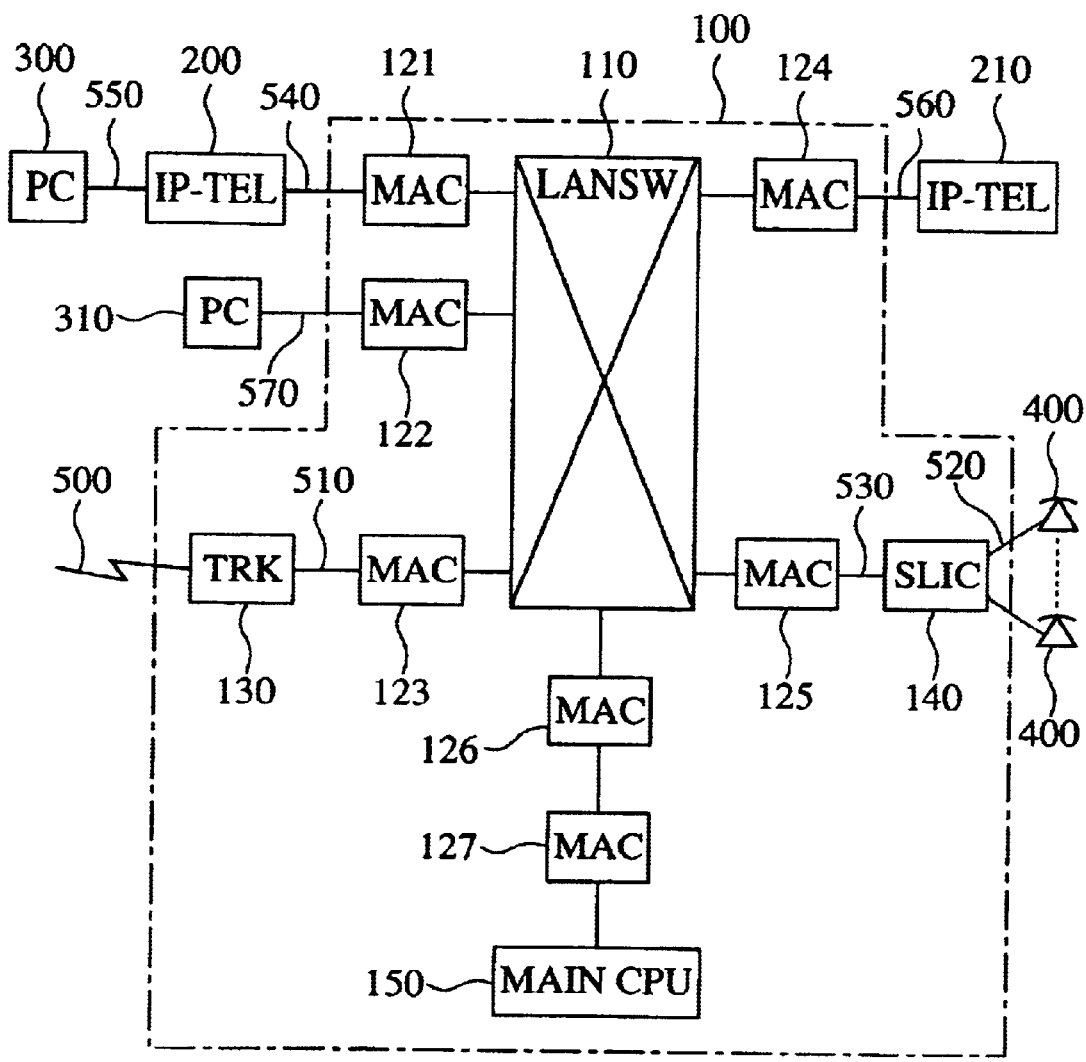
FIG. 1 is a block diagram showing the general composition of a system relating to an embodiment of this invention.

Below, an embodiment of this invention is described with reference to the drawings. In the drawings, the size, shape and positional relationships of the constituent elements are simply depicted in an approximate fashion for the purpose of understanding the invention, and furthermore, it should be recognized that the numerical conditions given below are no more than illustrative examples.

The general composition of an exchange system relating to this embodiment is now described with reference to the functional block diagram in FIG. 1.

Figure 2:
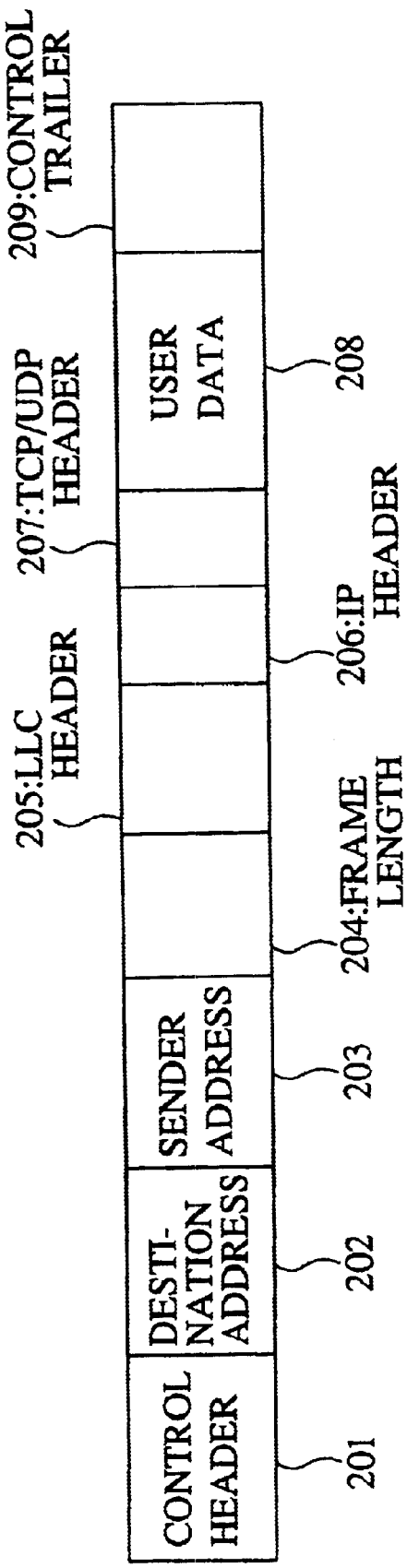
FIG. 2 is a conceptual diagram illustrating the composition of a MAC frame.

The exchange 100 comprises a LAN switch 110, media access control (MAC) circuits 121–127, a trunk circuit (TRK) 130, a subscriber line interface circuit (SLIC) and a main CPU 150. MAC frames are used for communications inside the exchange 100. A MAC frame defines a protocol relating to the physical layer and data link layer of an OSI (Open Systems Interconnection) reference model. As illustrated in the conceptual diagram in FIG. 2, a MAC frame is constituted by a control header 201 and a control trailer 209, and located therebetween, a destination address 202 including a port number, a sender address 203, frame length 204, logical link control (LLC) header 205, Internet protocol (IP) header 206, TCP/UDP header 207 and user data 208.

In the exchange 100 illustrated in FIG. 1, the LAN switch 110 is provided with a plurality of ports. Each port is connected respectively to a MAC circuit 121–126. The LAN switch 110 inputs MAC frames from the MAC circuits 121–126 via the input ports, and reads the destination address relating to the MAC frame and determines the output port corresponding to that destination. The correspondence relationships between destination addresses and output ports are stored in a MAC address table inside the LAN switch 110. The LAN switch 110 connects the corresponding output port to the input port at which the MAC frame was input.

The MAC circuits 121–127 are used as MAC frame assembling and dissembling circuits. In other words, the MAC circuits 121–127 input MAC frames transferred from IP-TEL 200, 210 SLIC 140 and TRK 130, and convert the MAC frames for port interface signals of MAIN CPU 150 and LAN switch 110. Also, the MAC circuits 121–127 assemble the MAC frames from port interface signals of MAIN CPU 150 and LAN switch 110, and transfer the MAC frames to IP-TEL 200, 210 and SLIC 140 and TRK 130.

Figure 3:
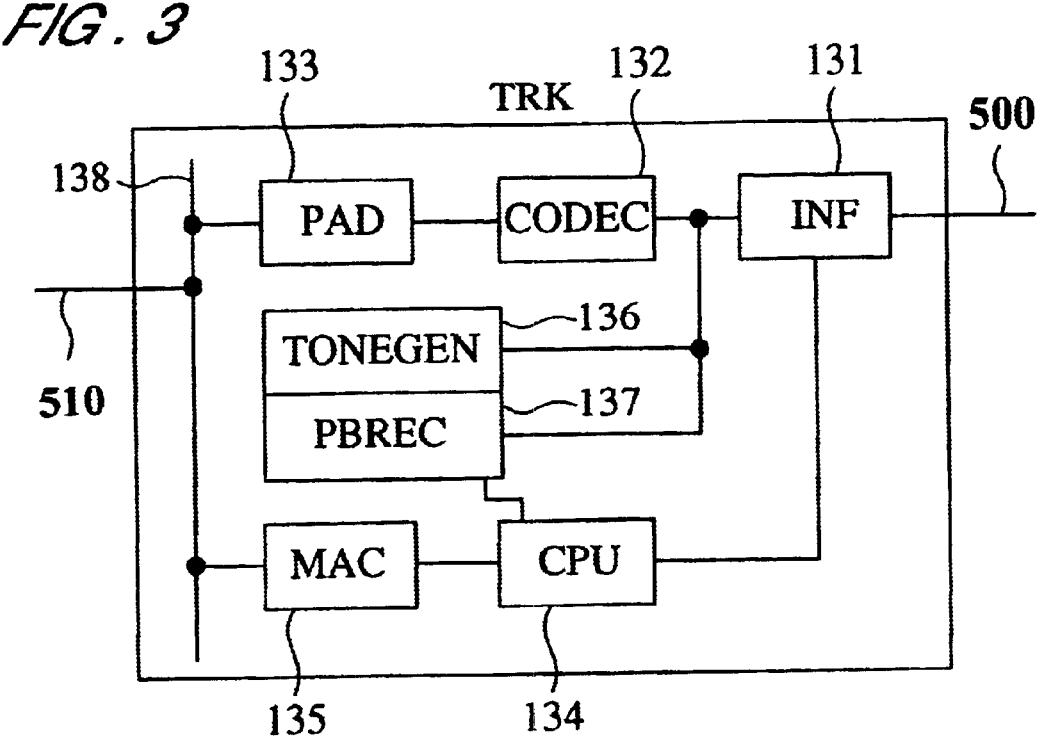
FIG. 3 is a block diagram showing an example of the internal composition of a trunk.

TRK 130 is connected to a relay circuit 500, such as a public telephone circuit, dedicated line, or the like, and to a MAC circuit 123. TRK 130 carries out mutual exchange of voice data used by the relay circuit 500 and MAC frames used within the exchange 100. The TRK 130 and MAC 123 are connected by a LAN connection line 510, such as a stranded cable, coaxial cable, optical cable, or the like, and are capable of providing a transmission speed of 1–100 Mbps, for example. In the block diagram of the internal composition of TRK 130 shown in FIG. 3, an interface circuit (INF) 131 separates a signal input from the relay circuit 500 into control signals relating to origination-reception, disconnection, blocking, or the like, a voice data. A CODEC 132 carries out analogue/digital conversion and digital/analogue conversion of the voice data. A packet assembling and dissembling circuit (PAD) 133 performs digital/MAC frame conversion and MAC frame/digital conversion of the voice data. A central processing unit (CPU) 134 controls the overall operation of the TRK 130 an also executes communications protocols as described hereinafter. A MAC 135 carries out digital/MAC frame conversion and MAC frame/digital conversion of control signals. A tone generating circuit (TONEGEN) 136 generates tone signals under the control of the CPU 134, and transmits these signals to INF 131. A push button reception circuit (PBREC) 137 decodes push button signals via INF 131 and transmits the corresponding decoding results to the CPU 134.

Figure 4:
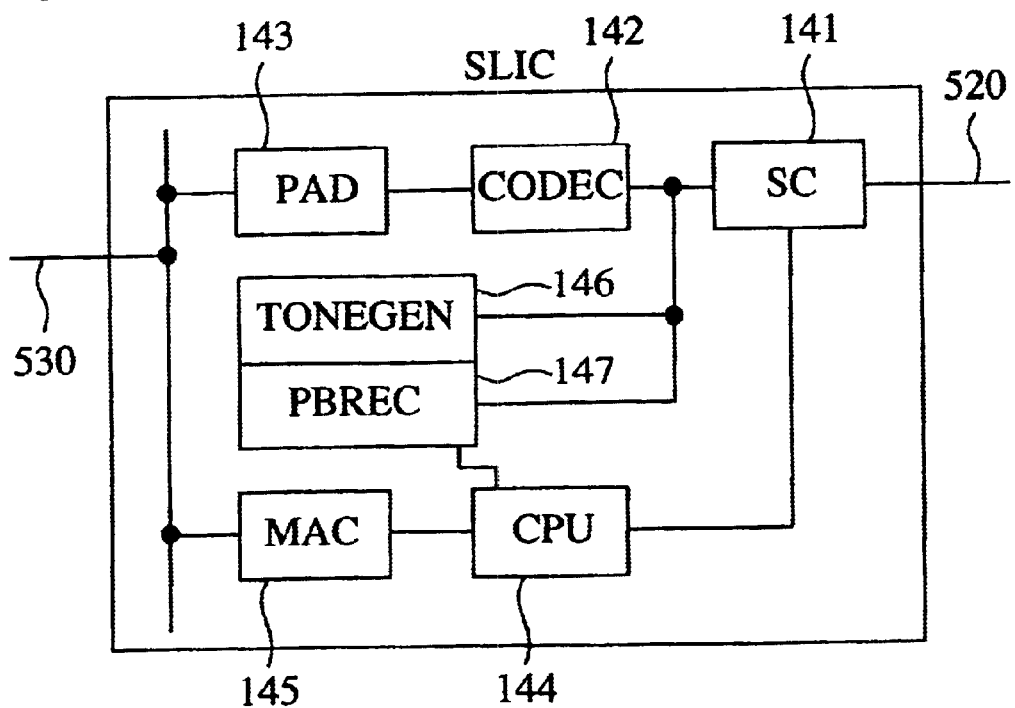
FIG. 4 is a block diagram showing an example of the internal composition of a subscriber line interface circuit.

In FIG. 1, SLIC 140 is connected to a PBX telephone 400 and to MAC 125. SLIC 140 carries out mutual exchange of voice data used by the PBX telephone 400 and MAC frames used within the exchange 100. SLIC 140 and the telephone 400 are connected to each other by means of a PBX circuit 520, such as a balanced cable, or the like. The SLIC 140 and MAC 125 are connected to each other by means of a LAN connection line 530. In the block diagram of the internal composition of SLIC 140 shown in FIG. 4, a subscriber circuit (SC) 141 separates signals input from the telephone 400 into control signals and voice data. A CODEC 142 carries out analogue/digital conversion and digital/analogue conversion of voice data. A PAD 143 carries out digital/MAC frame conversion and MAC frame/digital conversion of the voice data. A CPU 144 controls the overall operation of SLIC 140 and also executes communications protocols as described hereinafter. A MAC 145 performs digital/MAC frame conversion and MAC frame/digital conversion of control signals. TONEGEN 146 generates tone signals under the control of CPU 144 and transmits these signals to SC 141. A PBREC 147 decodes push button signals input via SC 141 and transmits the corresponding decoding results to the CPU 144.

A main CPU 150, is connected to the LAN switch 110 via two MACs 126, 127, for example. The CPU 150 executes PBX services such as call origination-reception control, connection verification and release, transmission and reception of switching information, camp on, pick up, incoming call transfer, and the like, and executes maintenance processing, when conducting voice data communications between the telephone400, relay circuit 500 and IP-TEL 200 and 210, as described hereinafter. It is also possible to use a standard personal computer or processing system comprising a server function in place of the main CPU 150 and MAC 127.

The exchange 100 is connected to a plurality of LAN terminals by means of LAN connection lines. In FIG. 1, in order to simplify the description, only the Internet protocol telephones (IP-TEL) 200, 210 and the personal computers 300 and 310 are depicted.

Figure 5:
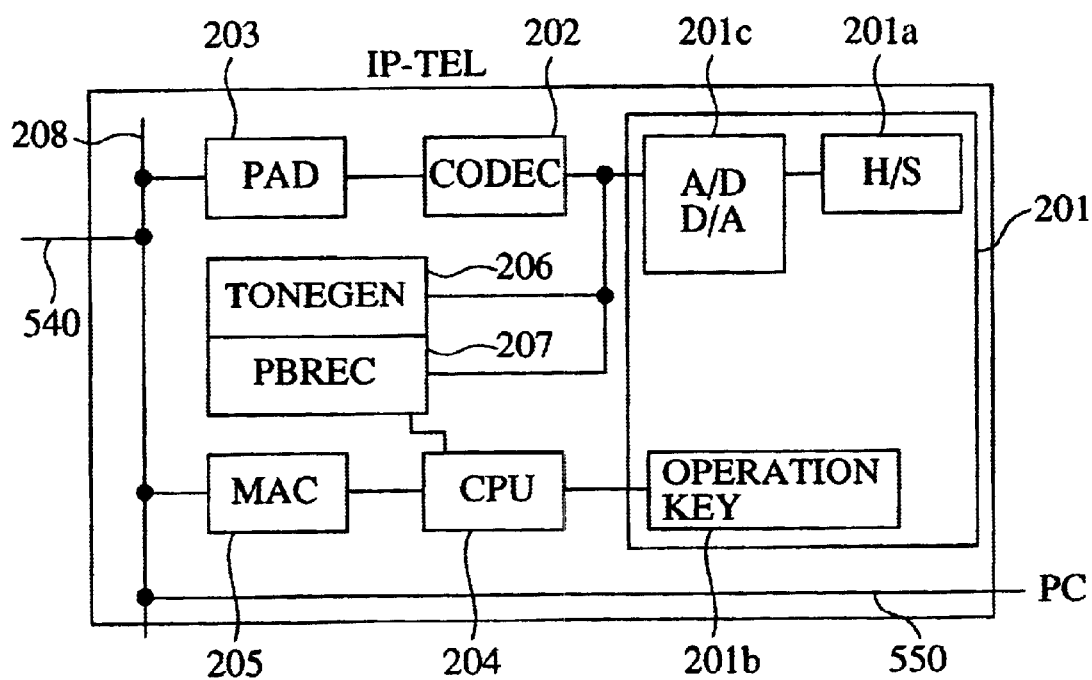
FIG. 5 is a block diagram showing an example of the internal composition of an Internet protocol telephone.

IP-TEL 200 is connected to the MAC 121 in the exchange 100 by means of a LAN connection line 540. IP-TEL 200 carries out voice data communications with relay circuit 500, PBX telephone 400 and IP-TEL 210, etc. by means of the exchange 100. In the block diagram of the internal composition of IP-TEL 200 shown in FIG. 5, a multi-function telephone 201 is provided with a handset (H/S) 201a, operating keys 201b, a converter 201 c for carrying out analogue/linear-digital conversion and lineardigital/analogue conversion, and the like. A CODEC 202 performs linear-digital-compression conversion and digital-compression/linear digital conversion of the voice data. A PAD 203 carries out digital/MAC frame conversion and MAC frame/digital conversion of the voice data. A CPU 204 controls the overall operation of the IP-TEL 200, and also executes communications protocols as described hereinafter. A MAC 205 carries out digital/MAC frame conversion and MAC frame/digital conversion of control signals. TONEGEN 206 generates dial tones or similar signals under the control of the CPU 24, and transmits these tones to the telephone 201. A PBREC 207 decodes dial signals (for example, push button signals,) input via the telephone 201, and it transmits the corresponding decoding results to CPU 204. A hub 208 serves as a relay between the LAN connection line 540 and the LAN connection line 550.

Desirably, the hub 208 is constituted in such a manner that it gives priority to processing voice data over data handled by a personal computer 300, or the like, connected under the IP-TEL 200. As the technology for carrying out processing of this kind, it is possible to adopt a LAN packet priority control system as disclosed in Japanese Patent Application No. 98-312804, for example.

In FIG. 1, IP-TEL 210 is connected to MAC 124 in the exchange by means of LAN connection line 560. IP-TEL 200 carries out voice data communications with relay circuit 500, PBX telephone 400 and IP-TEL 200, etc, by means of the exchange 100. The internal composition of IP-TEL 210 is the same as that of IP-TEL 200, and hence description thereof is omitted here (see FIG. 5).

A PC 300 is connected to the LAN connection line 550. In other words, the PC 300 is connected to MAC 121 in the exchange 100, via IP-TEL 200. The PC 300 carries out communication of data other than voice data with a LAN terminal, such as a PC 310, for example, using MAC frames.

The PC 310 is connected to MAC 122 in the exchange 100 by means of a LAN connection line 570, and it carries out data communications with a LAN terminal, such as PC 300, for example.

Next, the operation of the system illustrated in FIG. 1 is described with reference to FIG. 6.

(a) Call Origination Processing and Call Reception Processing

The operation of the system in the case of call origination processing and call reception processing is now described with reference to a case where IP-TEL 200 originates a call to IP-TEL 210.

Firstly, the telephone device 201 in IP-TEL 200 detects an off-hook operation of H/S 201a by the user. The telephone device 201 then transmits this detection of the off-hook operation to the CPU 204. When it receives this notification, the CPU 204 instructs TONEGEN 206 to output a dial tone. Upon receiving this instruction, TONEGEN 206 implements calculational processing for generating a dial tone, whereupon it outputs a dial tone to the H/S 201a.

When the user operates key 201b, a dial signal is generated by the telephone device 201, and this signal is transmitted to PBREC 207. PBREC 207 decodes the dial signal and transmits the corresponding decoding result to the CPU 204.

Upon receiving the decoding result, the CPU 204 calls up the main CPU 150 via the LAN switch 110 and the like. The main CPU 150 communicates with the CPU 204 by means of a RAS procedure according to ITU-T Recommendation H.323, for example, whereby it acquires the IP address and port number of the communication party, namely, IP-TEL 210, from the H.323 gatekeeper in the main CPU 150. Thereupon, the main CPU 150 carries out call origination processing with respect to IP-TEL 210 in accordance with processing procedure Q.931/H.245 of ITU-T Recommendation H.323, for example.

Whilst this call origination processing is being carried out, TONEGEN 206 in IP-TEL 200 carries out calculations for generating a ring back tone, under the control of the CPU 204.

This ring back tone is transmitted by TONEGEN 206 to the H/S 201a in telephone device 201.

The CPU in the receiving IP-TEL 210 carries out call reception processing in response to the call origination processing by main CPU 150, in accordance with procedure Q.931/H.245 of ITU-T Recommendation H.323, for example. The telephone device in IP-TEL 210 outputs a ringing tone until that telephone device is answered, in other words, until it is taken off the hook.

Thereupon, encoding rules for the voice data to be communicated are determined, in accordance with procedure H.245 described above, for example.

Call origination processing and call reception processing are completed when the H/S of the telephone device provided in the receiving IP-TEL 210 is taken off hook by the user, whereupon a communicating state is entered.

(b) Call Processing

Call processing is described with reference to an example where voice data is transmitted from IP-TEL 200 to IP-TEL 210.

Firstly, an analogue signal of the voice input to H/S 201a of IP-TEL 200 is converted to a digital signal by the converter 201c. Thereupon, CODEC 202 encodes this digital signal under the control of the CPU 204. The encoding rules used here may be, for example, ITU-T Recommendations G.711, G.729, G.723.1. The encoded voice data is transmitted to PAD 203. PAD 203 creates an IP packet of fixed length, in other words, a MAC frame, at prescribed time intervals. The voice data is transmitted by means of these MAC frames to the LAN switch 110, via the MAC 121.

Upon receiving a MAC frame from the IP-TEL 200, the LAN switch 110 determines the output port corresponding to the destination of the MAC frame, and it sends the MAC frame to the corresponding output port. Here, the destination is IP-TEL 210, so the MAC frame is sent to the output corresponding to IP-TEL 210. The output port is determined by means of the MAC address 202 contained in the MAC frame and the MAC address table provided in the switch 110.

IP-TEL 210 receives the MAC frame via MAC 124. The received MAC frame is input to the PAD inside IP-TEL 210. The PAD then decodes the MAC frame and sends voice data to the CODEC. The CODEC decodes the voice data according to encoding rules transmitted by the CPU in IP-TEL 210. The decoded voice data is then converted to an analogue signal by a converter in the telephone device, transmitted to the H/S and reproduced by the H/S.

(c) Disconnection Processing

Disconnection processing is described with reference to a case where a disconnection is made by IP-TEL 210.

If the user of the telephone device of IP-TEL 210 performs an on-hook operation, then this operation is detected by means of H/S housing interface in the telephone device. This detection result is transmitted from the telephone device to the CPU in IP-TEL 210. Upon receiving notification that an on-hook operation has been detected, this CPU carries out disconnection processing with the main CPU 150. On the other hand, the CPU 204 inside IP-TEL 200 responds to this disconnection process, with respect to the main CPU 150. As a protocol for this disconnection processing, it is possible to use call processing procedure Q.931/H.245 in the ITU-T Recommendation H.323, for example. Thereupon, the CPU in the IP-TEL 210 carries out RAS processing according to ITU-T Recommendation H.323, for example, with respect to the main CPU 150, whilst the CPU 204 in IP-TEL 200 carries out similar processing with respect to the main CPU 150. Thereby, disconnection processing is completed.

(d) Communications Processing in SLIC

The operation of the system in cases where call origination or call reception processing, communications processing or disconnection processing is carried out by SLIC 140 is similar to cases involving communication by IP-TEL, with the exception that the voice interface is an analogue telephone device rather than a H/S.

(e) Communications Processing in TRK

The operation of the system in cases where call origination or call reception processing, communications processing or disconnection processing is carried out by TRK 130 is similar to cases involving communication by IP-TEL, with the exception that an INF 131 is used instead of a multi-function telephone, and the voice interface is a relay circuit 400., rather than a H/S.

In this way, in the system relating to this invention, since protocols are executed by means of the main CPU 150, rather than by communicating directly between devices engaged in communications, when any of the devices 130, 140, 200 performs call origination or call reception processing, or disconnection processing, it is possible to carry out voice data communications between having different types of transmission paths, exchange systems and communications speeds, by using a LAN switch 110.

What is claimed is:

1. A voice data exchange system comprising:

first connecting means for carrying conversion between a voice data format of a public telephone network and that of a MAC frame;

second connecting means for carrying out conversion between a voice data format of a private telephone network and that of a MAC frame;

data network telephone device for executing voice communication using MAC frames;

switching means provided with a port for accommodating said first connecting means, a port for accommodating said second connecting means and a port for accommodating said data network telephone device, for carrying out switching of the ports in accordance with destination addresses contained in the MAC frames received from said first connecting means, said second connecting means or said data network telephone device; and main control means for executing a first call establishment protocol and a first call disconnection protocol toward said first connecting means on behalf of said second connecting means and said data network telephone device, executing a second call establishment protocol and a second call disconnection protocol toward said second connecting means on behalf of said first connecting means and said data network telephone device, and executing a third call establishment protocol and a third call disconnection protocol toward said data network telephone device on behalf of said first and second connecting means.

2. The voice data exchange system according to claim 1, wherein said first connecting means comprises interfacing means for transmitting and receiving voice data and control signals with said public telephone network; codec means for encoding voice data which is input from said interfacing means and decoding voice data which is output to said interfacing means; disassembling and assembling means for dissembling MAC frames received from said switching means and outputting voice data to said codec means, and assembling MAC frames containing voice data input from said codec means and transmitting said MAC frames to said switching means; and internal control means for executing communications protocols for call origination processing, call reception processing and disconnection processing, by communicating with said main control means on the basis of said control signals received by said interfacing means.

3. The voice data exchange system according to claim 2, wherein said first connecting means comprises means for generating a ring back tone and means for generating a ringing tone.

4. The voice data exchange system according to claim 2, comprising media access control means for assembling and disassembling the MAC frame, located between said first connecting means and said switching means.

5. The voice data exchange system according to claim 4, wherein said first connecting means and said media access control means are connected by a local area network connection line.

6. The voice data exchange system according to claim 1, wherein said second connecting means comprises subscriber means for transmitting and receiving voice data and control data; codec means for encoding voice data which is input from said subscriber means and decoding voice data which is output to said subscriber means; disassembling and assembling means for disassembling MAC frames received from said switching means and outputting voice data to said codec means, and assembling MAC frames containing voice data input from said codec means and transmitting said frames to said switching means; and internal control means for executing communications protocols for call origination processing, call reception processing and disconnection processing, by communicating with said main control means on the basis of said control signals received by said subscriber means.

7. The voice data exchange system according to claim 6, wherein said second connecting means comprises means for generating a ring back tone and means for generating a ringing tone.

8. The voice data exchange system according to claim 6, comprising media access control means for assembling and disassembling the MAC frame, located between said second connecting means and said switching means.

9. The voice data exchange system according to claim 8, wherein said second connecting means and said media access control means are connected by a local area network connection line.

10. The voice data exchange system according to claim 1, wherein said Private Telephone Network is a network using a Private Branch Exchange System.

11. The voice data exchange system according to claim 1, wherein said data network telephone device comprises a multi-function telephone device for transmitting and receiving voice data and control signals; codec means for encoding voice data input from said multi-function telephone device and decoding voice data output to said multi-function telephone device; disassembling and assembling means for disassembling MAC frames received from said switching means and outputting voice data to said codec means, and for assembling MAC frames containing voice data input from said codec means and transmitting said MAC frames to said switching means; and internal control means for executing communications protocols for call originating processing, call reception processing and disconnection processing, by communicating with said main control means on the basis of said control signals input from said multi-function telephone device.

12. The voice data exchange system according to claim 11, wherein said data network telephone device comprises means for generating a ring back tone and means for generating a ringing tone.

13. A voice data exchange system according to claim 11, comprising media access control means for assembling and disassembling the MAC frame, located between said data network telephone device and said switching means.

14. The voice data exchange system according to claim 13, wherein said data network telephone device and said media access control means are connected by a local area network connection line.

15. The voice data exchange system according to claim 1, wherein said data network telephone device is an Internet telephone.

16. The voice data exchange system according to claim 1, wherein said data network telephone device is connected to a terminal device which handles data other than voice data.

17. The voice data exchange system according to claim 16, wherein said data network telephone device has a voice priority control circuit which gives priority to process the voice data of said data network telephone device over said data of said terminal device.

18. The voice data exchange system according to claim 16, wherein said data network telephone device and said terminal device are connected by a local area network connection line.

19. The voice data exchange system according to claim 1, wherein said switching means comprises a port for accommodating a terminal device which handles data other than voice data.

20. A voice data exchange system according to claim 19, comprising media access control means for assembling and disassembling the MAC frame, located between said switching means and said terminal device.

21. The voice data exchange system according to claim 20, wherein said terminal device and said media access control means are connected by a local area network connection line.

22. The voice data exchange system according to claim 1, wherein said public telephone network is a network using a circuit switching system.

23. A voice data exchange system comprising:
   a trunk for carrying out mutual conversion between a voice data format of a public telephone network and that of a MAC frame;
   a subscriber line interface circuit for carrying out mutual conversion between a voice data format of a private telephone network and that of a MAC frame;
   a data network telephone device for executing voice communication using MAC frames;

a LAN switch provided with a port for accommodating said trunk, a port for accommodating said subscriber line interface circuit and a port for accommodating said data network telephone device and, for carrying out switching of the ports in accordance with destination addresses contained in the MAC frames received from said trunk, said subscriber line interface circuit or said data network telephone device; and a main CPU for executing a first call establishment protocol and a first call disconnection protocol toward said first connecting means on behalf of said second connecting means and said data network telephone device, executing a second call establishment protocol and a second call disconnection protocol toward said second connecting means on behalf of said first connecting means and said data network telephone device, and executing a third call establishment protocol and a third call disconnection protocol toward said data network telephone device on behalf of said first and second connecting means.

* * * * *

UNITED STATES PATENT AND TRADEMARK OFFICE
CERTIFICATE OF CORRECTION

PATENT NO. : 6,658,020 B2
DATED : December 2, 2003
INVENTOR(S) : Masazumi Isaka and Keiji Matsunuma It is certified that error appears in the above-identified patent and that said Letters Patent is hereby corrected as shown below:

<u>Title page,</u>
Item [73], insert -- Tokyo -- after "Ltd.".

Signed and Sealed this

Twentieth Day of April, 2004

JON W. DUDAS
*Acting Director of the United States Patent and Trademark Office*